(12) United States Patent
Albright (10) Patent No.: US 7,396,070 B2
(45) Date of Patent: Jul. 8, 2008

(54) RELOCATABLE POSITION OPERATOR SEAT STATION FOR LOADER

(75) Inventor: Larry E. Albright, Gwinner, ND (US)

(73) Assignee: Clark Equipment Company, West Fargo, ND (US)

( * ) Notice: Subject to any disclaimer, the term of this patent is extended or adjusted under 35 U.S.C. 154(b) by 178 days.

(21) Appl. No.: 11/132,506

(22) Filed: May 19, 2005

(65) Prior Publication Data

US 2005/0264038 A1 Dec. 1, 2005

Related U.S. Application Data

(60) Provisional application No. 60/574,636, filed on May 26, 2004.

(51) Int. Cl.
*B62D 33/067* (2006.01)

(52) U.S. Cl. .................................. 296/190.05

(58) Field of Classification Search ............ 296/190.01, 296/190.03, 190.04, 190.05, 190.06, 190.08; 180/89.12, 89.13, 89.14, 89.15, 89.16, 89.17, 180/89.18, 89.19

See application file for complete search history.

(56) References Cited

U.S. PATENT DOCUMENTS

| | | | | |
|---|---|---|---|---|
| 3,933,262 A | | 1/1976 | Cresp ..................... | 214/138 R |
| 4,117,944 A | | 10/1978 | Beckstrom et al. .......... | 214/131 |
| 4,150,504 A | | 4/1979 | Asche ..................... | 37/103 |
| 4,222,451 A | * | 9/1980 | Lamb ..................... | 180/89.18 |
| 4,235,299 A | * | 11/1980 | Reynolds ................. | 180/328 |
| 4,253,700 A | * | 3/1981 | Di Francescantonio | 296/190.05 |
| 4,372,411 A | * | 2/1983 | Flower .................... | 180/89.15 |
| 4,401,179 A | | 8/1983 | Anderson ................ | 180/89.14 |
| 4,405,280 A | | 9/1983 | Cochran et al. ............ | 414/685 |
| 4,408,672 A | | 10/1983 | Albright et al. .......... | 180/89.14 |
| 4,440,437 A | * | 4/1984 | Hahm et al. ............ | 296/190.05 |
| 4,483,409 A | * | 11/1984 | Fun ........................ | 180/89.15 |
| 4,682,666 A | | 7/1987 | Klee et al. ............... | 180/89.13 |

(Continued)

FOREIGN PATENT DOCUMENTS

CH 678 544 A5 9/1991

(Continued)

OTHER PUBLICATIONS

Search Report and Written Opinion for application No. PCT/US2005/017657 filed May 20, 2005.

(Continued)

*Primary Examiner*—H Gutman
(74) *Attorney, Agent, or Firm*—Westman, Champlin & Kelly, P.A.

(57) ABSTRACT

A loader has an operator's station, comprising a cab with an operator's seat that is mounted on a pivot at the forward portions of the operator's station. An actuator is mounted between the operator's station and a loader frame to tilt the operator's station about the pivot a limited number of degrees when operating accessories mounted on a forward portion of the loader frame. The accessory is shown as a backhoe, and the forward tilting of the operator's station permits increased the downward field of view for an operator to observe the lower end of a digging arm of a backhoe at greater depths than with a fixed position operator's station.

16 Claims, 11 Drawing Sheets

U.S. PATENT DOCUMENTS

| | | | | |
|---|---|---|---|---|
| 4,811,983 A | * | 3/1989 | Watts et al. | 296/190.05 |
| 4,955,785 A | | 9/1990 | Cohen | 415/26 |
| 5,016,722 A | | 5/1991 | Morita et al. | 180/89.14 |
| 5,042,602 A | | 8/1991 | Nakatani et al. | 180/68.1 |
| 5,398,774 A | * | 3/1995 | Nilsson et al. | 180/89.14 |
| 5,518,358 A | | 5/1996 | Aschroft et al. | 414/685 |
| 5,520,500 A | * | 5/1996 | McIlwain et al. | 414/685 |
| 5,524,722 A | * | 6/1996 | Bowman et al. | 180/89.17 |
| 5,551,826 A | | 9/1996 | Todd et al. | 414/685 |
| 5,918,694 A | | 7/1999 | Miller et al. | |
| 6,357,820 B1 | * | 3/2002 | Nagatsuka et al. | 296/190.06 |
| 6,543,563 B1 | * | 4/2003 | Muraro | 180/89.12 |
| 6,910,731 B2 | * | 6/2005 | Albright et al. | 296/190.05 |
| 2004/0084924 A1 | | 5/2004 | Albright et al. | 296/50 |
| 2004/0119320 A1 | | 6/2004 | Albright et al. | 296/190.05 |

FOREIGN PATENT DOCUMENTS

| | | |
|---|---|---|
| EP | 1 201 831 | 5/2002 |
| JP | 7-285792 | 4/1994 |
| JP | 2003-336288 | 5/2002 |

OTHER PUBLICATIONS

European Patent Office Partial International Search and Invitation to Pay Add'l Fees.

* cited by examiner

RELOCATABLE POSITION OPERATOR SEAT STATION FOR LOADER

This application refers to and is based on and claims the benefit of priority on U.S. Provisional Application Ser. No. 60/574,636, filed May 26, 2004, the contents of which is incorporated by reference.

CROSS REFERENCE TO RELATED APPLICATION

Reference is made to U.S. Patent Publication No. 2004-0119320 A1, published Jun. 24, 2004 and owned by the same Assignee.

BACKGROUND OF THE INVENTION

The present invention relates to a loader that has a relocatable or multiple position operator's station achieved by pivoting the disclosed operator's cab about a forward corner pivot axis such that the cab and the operator seat can be tilted forwardly a selected number of degrees and retained in that position to provide for greater downward angle visibility for operating front mounted digging arms, such as backhoes. By tilting the cab, good visibility for deep excavations can be obtained without requiring the operator to relocate to a second seat or station mounted on the backhoe or digger.

Typical backhoe attachments at the front end of loaders require the operator to relocate from the operator's station to a second seat mounted on the backhoe frame to obtain good visibility for deep excavations. This usually requires controls in two locations and it take time to accomplish moving the operator's seat.

Forward pivoting cabs that have releasable latches so that the cab can be pivoted forwardly to open the region under the cab for service, are known. This full open movement provides clearance for components underneath the cab.

SUMMARY OF THE INVENTION

The present invention relates to a self-propelled vehicle, as shown, a skid steer loader having a front mounted backhoe and a forward pivoting cab comprising an operator's station that can be moved frame first working into a forwardly tilted position to increase a downward visibility for an operator without requiring the operator to relocate to a seat on the backhoe frame, particularly when deep excavations are being made with the backhoe.

The forward pivoting cab carries the operator seat on the second working normal seat mountings to the forward tilted position and raised and is retained in such position. The controls for the backhoe remain in place in the cab. The operator can operate the backhoe as normally done, but the increase in downward angle visibility for deep excavations at the front of the self-propelled vehicle is desirable for backhoe operation.

The operator cab can be latched into place in the normal first working operating position for the loader. The cab is tilted about a forward pivot preferably using power actuators moving the rear mounting supports for the cab. The latches then can remain latched as the cab is tilted. Interlock control systems can be used to prevent the loader arms or other equipment from being operated until the cab is again in its normal working position.

The forward tilting of the cab can be carried out manually, and then held in place with pinned or bolted connections or stops or with power operators of various kinds. As shown, the power operator is an actuator that supports base or rear mounting portions for the cab latch, that normally are fixed with respect to the loader frame. The latches remain secured as the cab tilts. The base latch portions, as shown are moved upwardly by the power actuators to cause the cab tilting.

The cab pivot axis also can be changed in position, if desired. A different pivot axis can cause a change in the operator's position for a given amount of cab pivoting.

The power operators or actuators for tilting the cab between two positions will securely hold the cab in position, and are easily installed with little additional cost. The manual pivoting with mechanical stops can also be any selected type.

DETAILED DESCRIPTION OF THE PREFERRED EMBODIMENTS

A self-propelled vehicle, as shown, a skid steer loader illustrated generally at 10, has a main frame 12, and drive and support wheels 14, 14 on opposite sides thereof. The wheels 14 are mounted on axles supported on the frame 12. The present invention can be used with track drive loaders and other self-propelled vehicle that mount digging arms, such as backhoes as well.

Power is supplied by an engine illustrated schematically at 19, and the engine drives and powers a hydraulic pump 21 for driving hydraulic motors for the drive wheels 14 in a normal manner. The hydraulic pump or pumps 21 are used for other hydraulic actuators or motors used on the loader.

The frame 12 supports links 18 that extend uprightly (FIG. 2), and these links 18 pivotally mount a lift arm assembly 20 that pivots on the links 18 about pivots 22. The lift arm assembly 20 is raised and lowered through the use of hydraulic actuators shown schematically at 17, that act between the lift arms of the lift arm assembly (one actuator on each side) and the links 18 for raising and lowering the lift arm assembly 20. The links 18 are pivotally mounted to the frame 12 at a lower end of the links.

Figure 1:
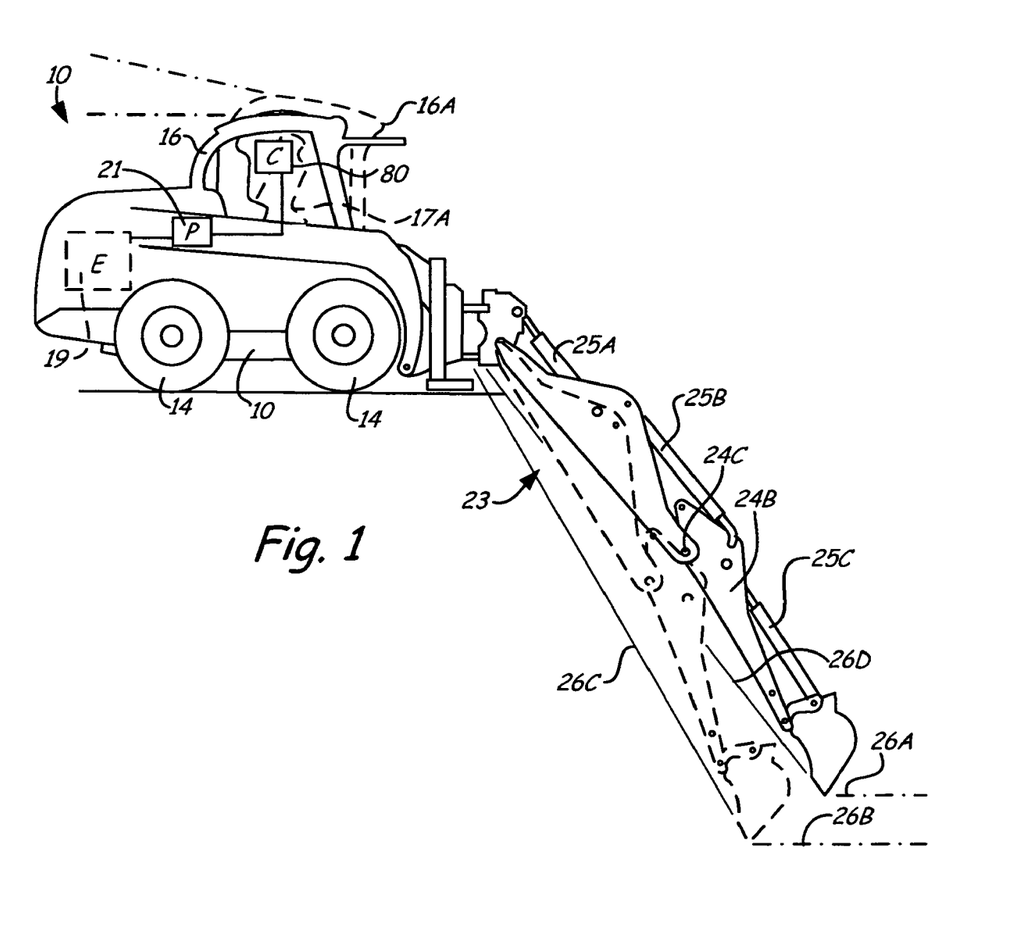
FIG. 1 is a schematic representation of a self-propelled vehicle, as shown, a skid steer loader, having a backhoe installed thereon showing two positions of the operator's station in accordance with the present invention.

An operator's station or cab 16 is shown in FIG. 1 in two different positions, with the solid line a normal or first working position for a loader with the operators seat generally oriented horizontally. The dotted outline of a cab, illustrated at 16A is in an operator's station or cab forward pivoted position or second working position according to the present invention.

Figure 2:
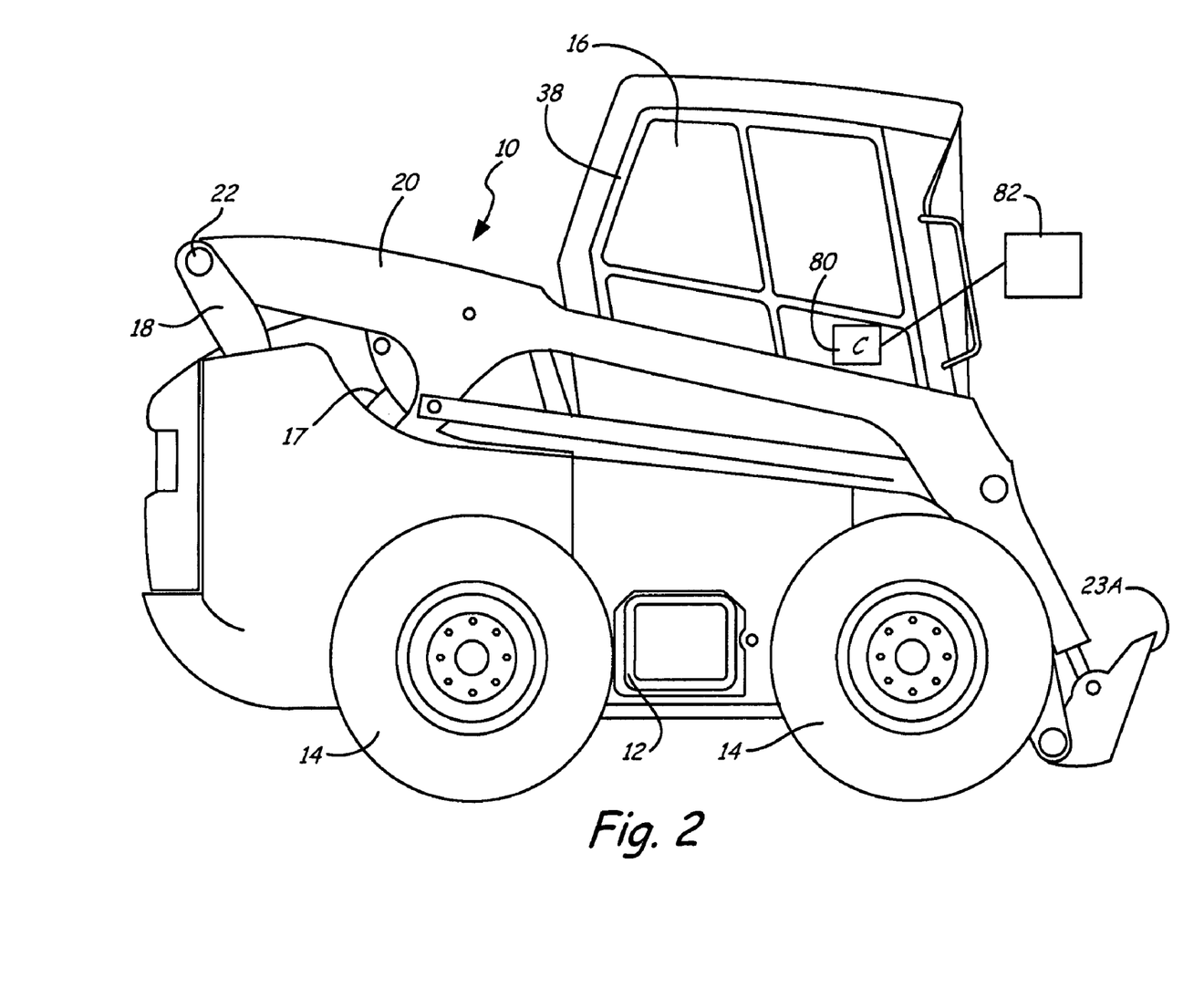
FIG. 2 is a side view of a loader and operator's station or cab with a backhoe removed.

The lift arms of the lift arm assembly 20 extend forwardly, and have a quick attachment plate 23A that is used for mounting a backhoe 23 shown in FIG. 1. The quick attachment plate 23A is shown in FIG. 2.

Figure 6:
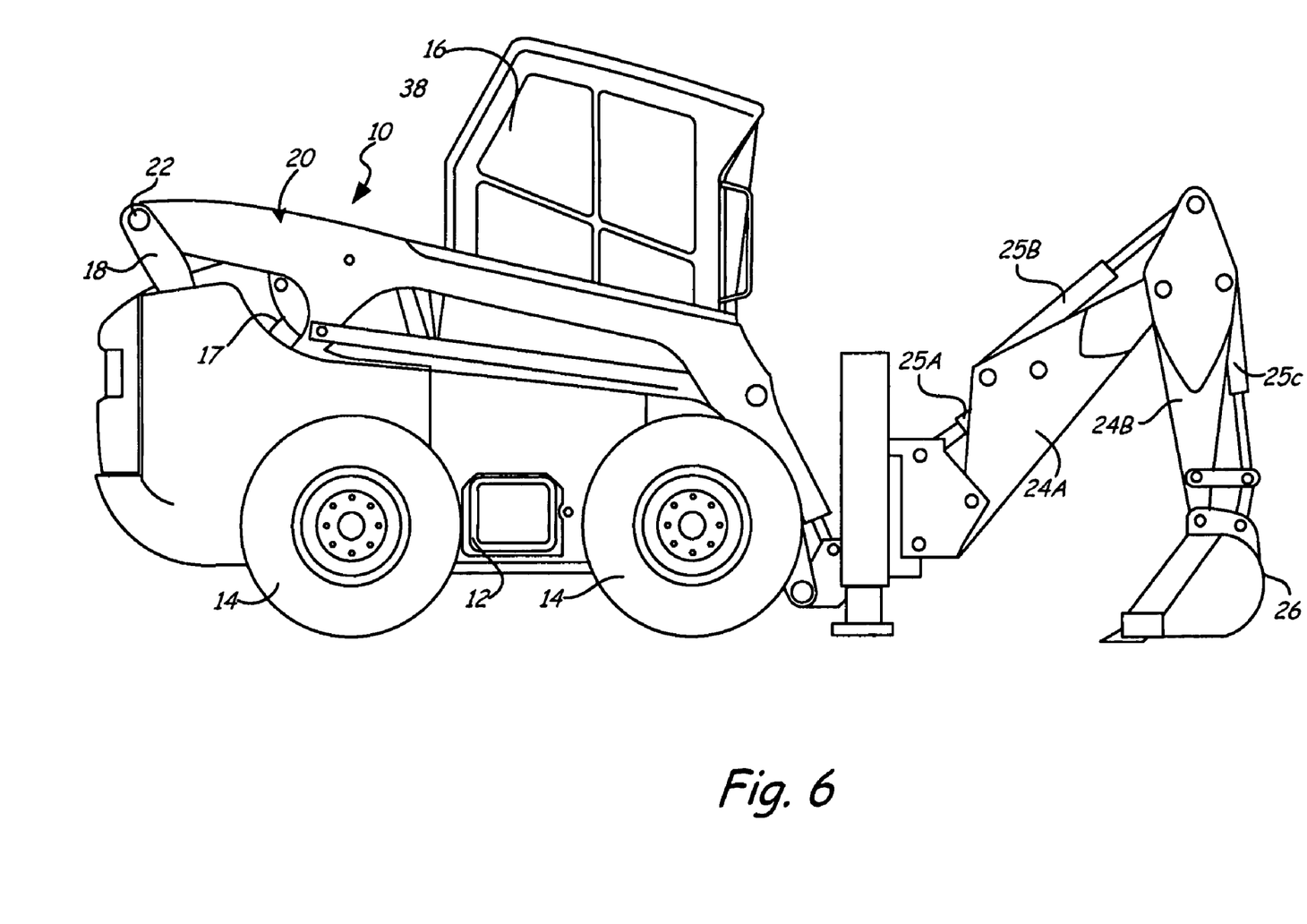
FIG. 6 is a side view of the skid steer loader with the cab in its forward tilted second working position and illustrating a backhoe at the forward portion of the skid steer loader about to be attached thereto.

The backhoe 23 is operated in a normal manner. The backhoe has arm sections 24A and 24B that are pivoted together at a pivot 24C, and the arm sections are operated through suitable hydraulic actuators shown schematically 25A, 25B, and 25C (see FIG. 6). The outer end of arm section 24B carries an excavator bucket 26, that is operated for digging trenches, as illustrated by the lines 26A and 26B in FIG. 1.

Figure 7:
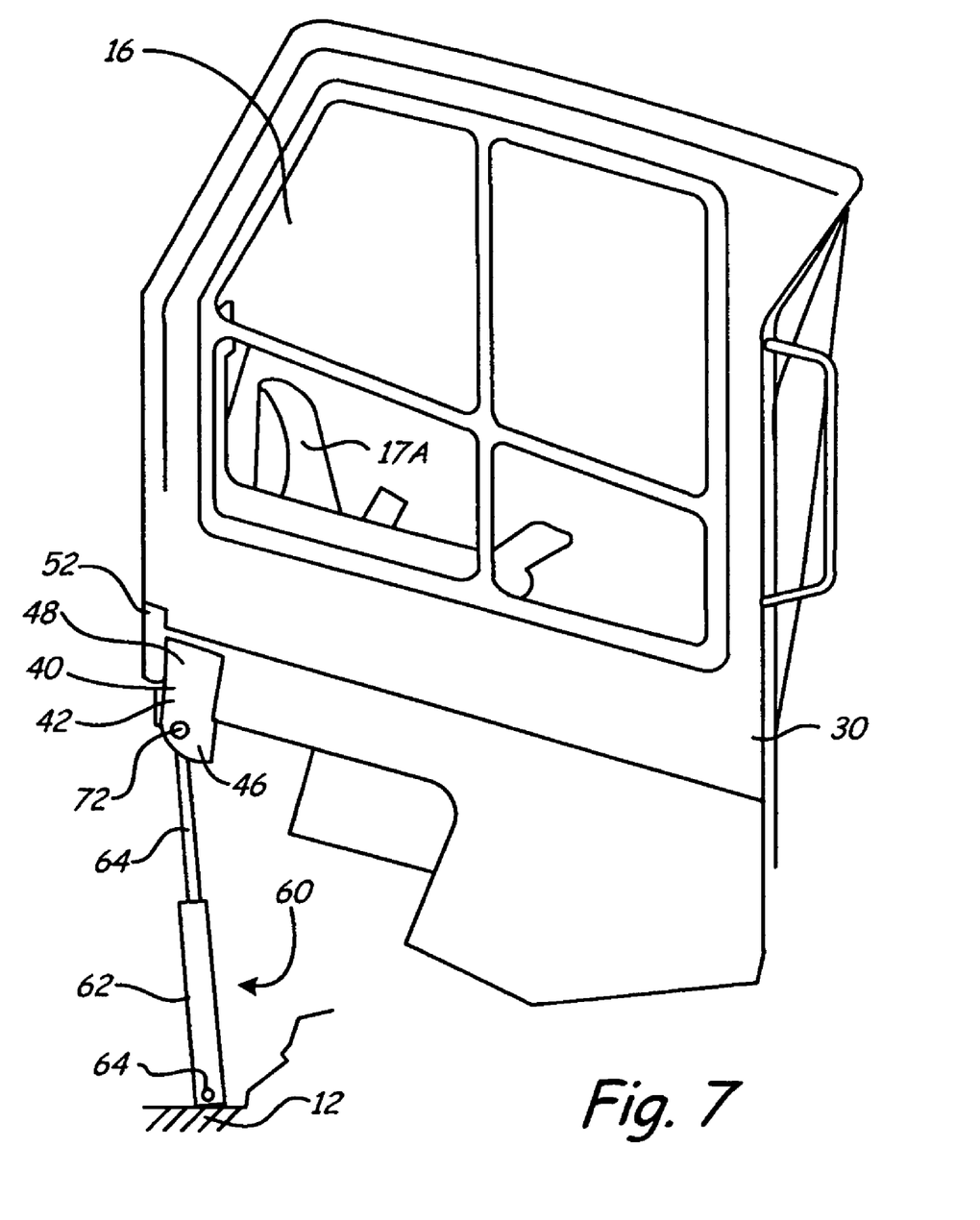
FIG. 7 is a view similar to FIG. 4 with the actuators extended and the cab in a tilted second working position.

FIG. 1 illustrates that the line of sight 26C of an operator on an operator's seat 17A (FIG. 7) with the cab tilted to its tilted position, permits viewing the bucket 26 at the outer end of the digging arm when it is at a lower level 26B. The operator's line of sight 26D, when the cab is in its normal working position 16 only permits viewing the bucket when digging to the lesser maximum depth 26A.

Figure 3:
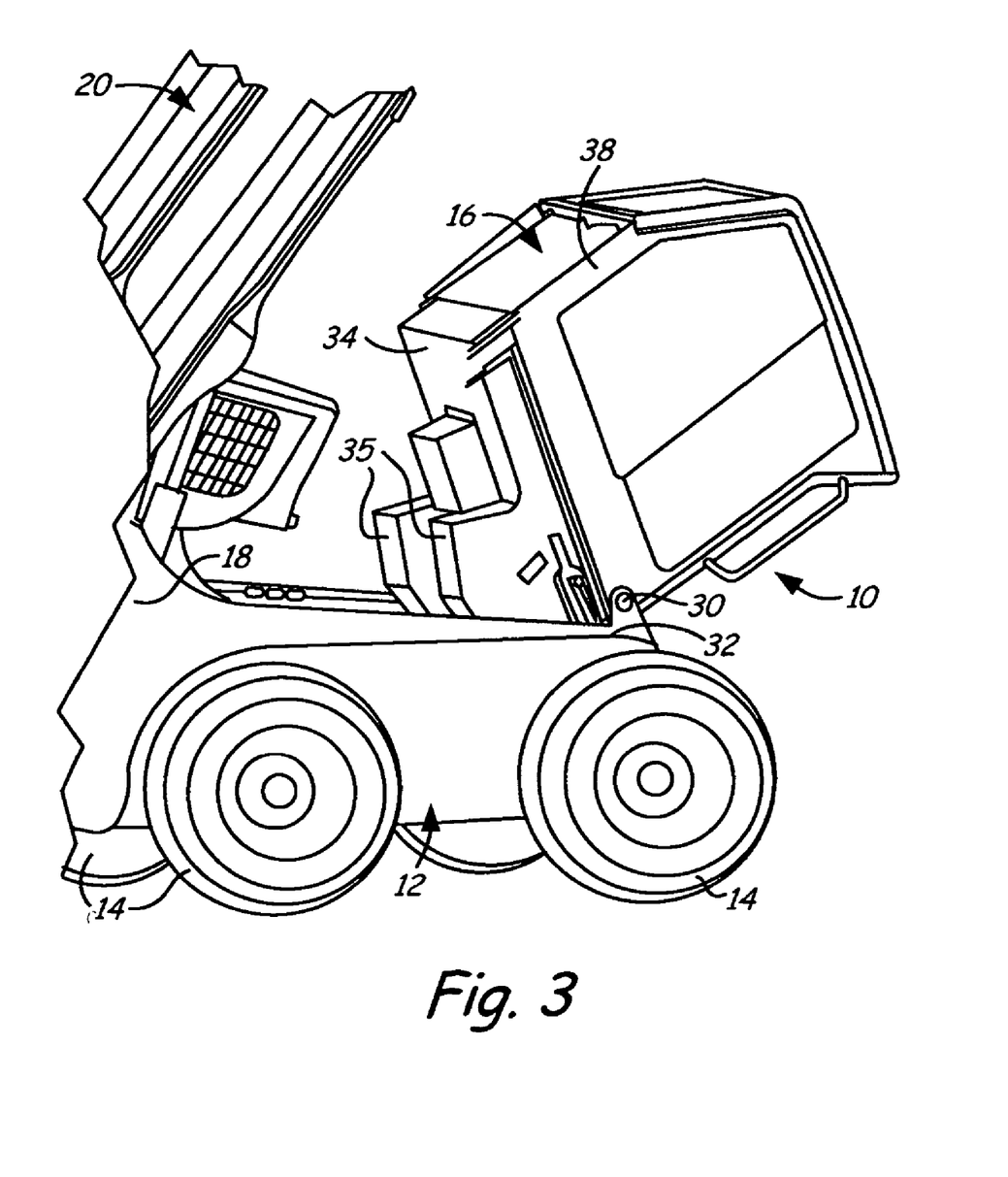
FIG. 3 is a schematic perspective view of a loader having a front pivoting cab shown with the latches unlatched and the cab tilted forwardly for access to loader components in the frame.

The cab 16 is mounted to the main frame 12 at the front lower corners of the cab 16 for pivoting about a horizontal axis defined by a pair of pivot pins 30 (see FIGS. 3 and 4), one on each side of the frame. The pins 30 are supported on upright members 32 that are fixed to the frame 12. In FIG. 3, the cab 16 is illustrated as being pivoted all the way forwardly for service of components between the side frame members and below the cab. The cab 16 is supported on the sturdy upright supports 32 at each of the forward corners of the frame 12, and these supports 32 are supported on the side members of the frame 12 between which the cab moves. The uprights 32 extend upwardly on the inside of the side frame members.

Figure 4:
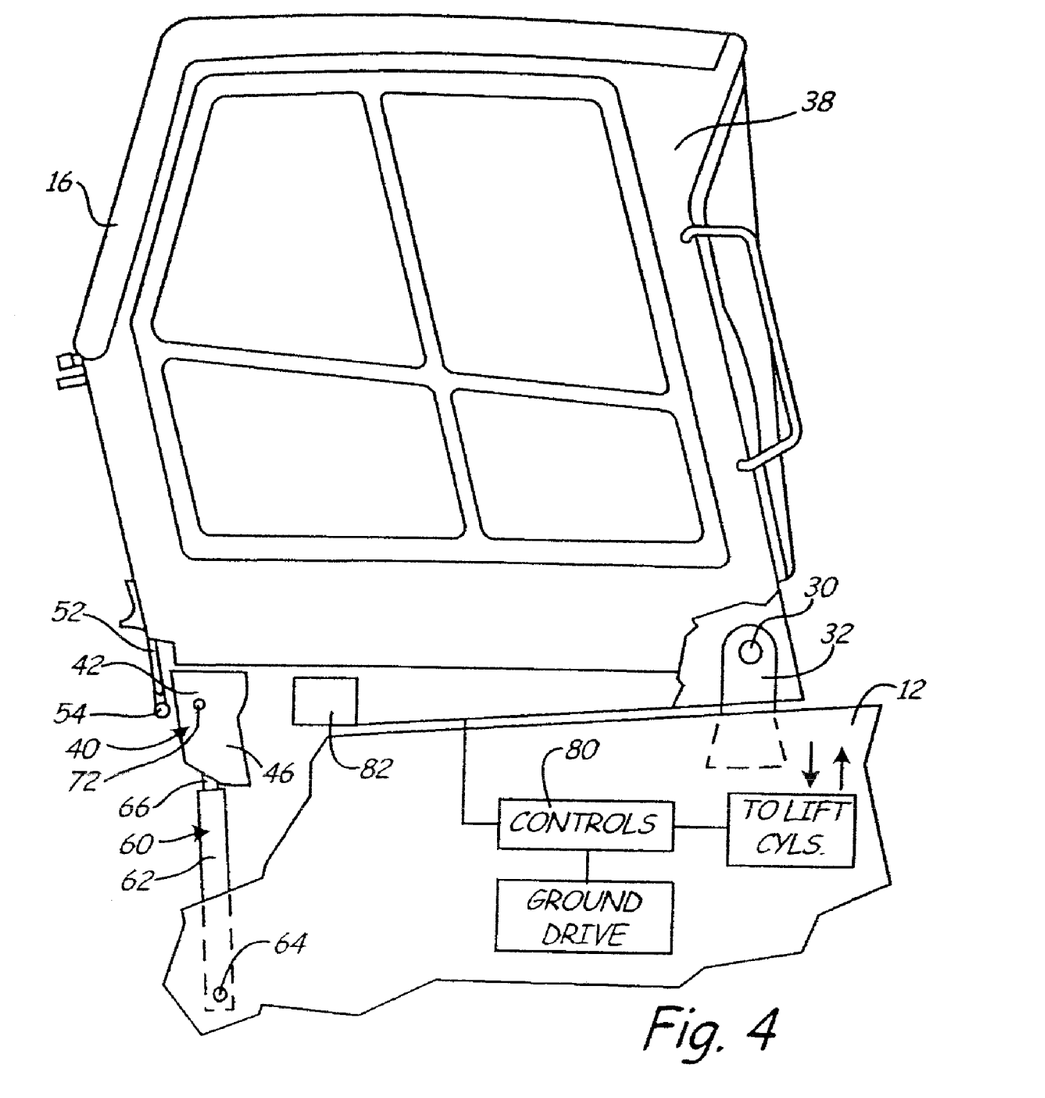
FIG. 4 is a fragmentary view illustrating a pivotal mounting bracket for the loader operator's cab of the present invention.

The pivot pins 30 for the cab are shown as fixed to the cab, and pivotably mount to the uprights through a suitable bushing, or other structure, on each side of the cab. The cab or operator's station can be constructed in any desired manner, but as shown, it has side walls 38, and it has an operator's seat pan 34 and recessed pods 35 forming a floor for the feet of an operator.

Figure 5:
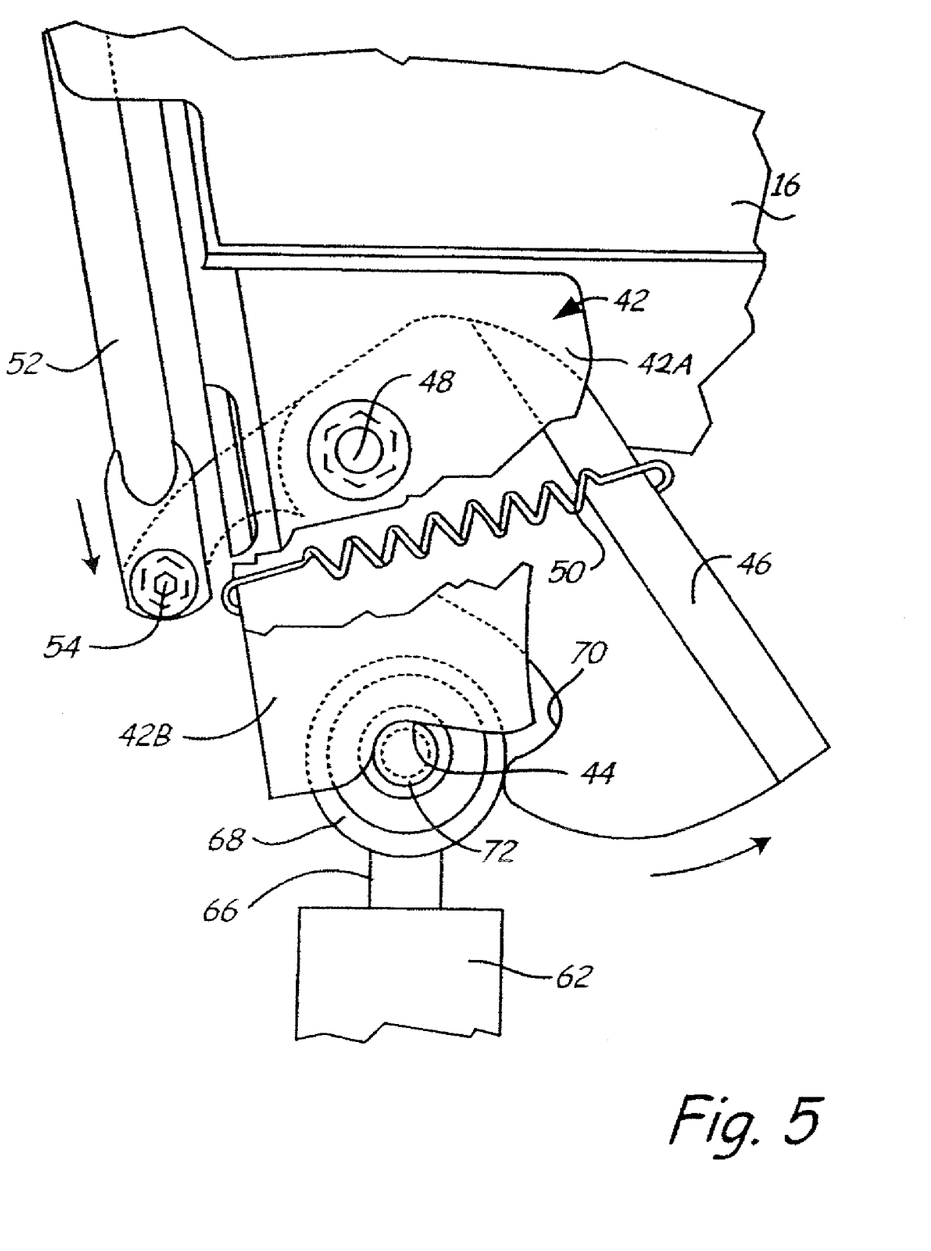
FIG. 5 is a fragmentary schematic representation of a rear portion of the cab in its normal operating position with a cab latch illustrated, and with an actuator for providing forward pivoting or tilt movement shown schematically.

The cab 16 is latched in place in its first normal working position, for loader operation as shown essentially in FIG. 4, with suitable latches illustrated generally at 40. These latches 40 can be similar to those shown in U.S. Patent Publication 2004-0119320-Al, published Jun. 24, 2004, which is incorporated by reference, or can be any desired latch. The latches 40 include, in the form shown, and as shown in FIG. 5, a bracket frame 42 that is channel-shaped, and has spaced walls 42A and 42B with lower edges configured to form seats or recesses 44. The bracket frames 42 are secured to the cab 16 on structural members. The latches 40 each have a latch dog 46 that is pivotally mounted as at 48 to the frame 42. Each latch dog 46 is urged to a closed or latched position with a spring 50 that acts between the latch dog 46 and bracket frame 42. The latch dogs 46 can be moved to a release position shown in FIG. 5 by moving an associated operator manual control link 52 downwardly. The link 52 is connected with a pin 54 to the respective latch dog 46 to manually control pivoting of the latch dog about the pin 48 to the release position against the action of spring 50, when it is desired to move the cab 16 to a full open position.

Each latch 40 has two parts, including the bracket frame 42 that is fixed to and moves with the cab and the latch dog 46 that has a latch recess 70. The cab is secured by the latch with an anchor pin 72 that is held in the latch recesses 44 and 70 when the cab is seated with the recesses or notches 44 on the pin 72 and the latch dog moved to its closed position to hold the respective anchor pin securely.

Each anchor pin 72 is anchored to the frame 12 of the loader, as shown, through the use of a controllable actuator 60, which has a cylinder or base portion 62 that is secured to the frame 12 with a suitable pin 64 (see FIG. 4). Each actuator 60 has an extendable and retractable rod 66 that can be controlled either by hydraulic fluid pressure, by an electric motor drive (it then comprises an electric linear actuator), or by other power sources desired.

If manual operation is desired, there could be two telescoping links in place of the rod and cylinder that could be pinned or held together in the normal or first working position and in the upwardly pivoted second working position.

The rod 66 of the actuator 60 has a rod end 68 that is connected to the rod, and the rod end 68 carries the respective anchor pin 72 that extends outwardly beyond the sides of the rod end.

The rod end 68 will fit between the legs or walls 42A and 42B of the channel shaped bracket frame 42 that is fixed to the cab (called the fixed bracket frame), and between the legs of the channel shaped latch 46. The pin 72 extends out beyond the legs of the fixed bracket frame 42 so that the ends of the pin 72 engage the recesses or seats 44 on the lower edges of the bracket frame. Then the latch dog 46 moves closed and the ends of pin 72 are locked in the notches 70 on the latch dog 46. The latch dog 46 is then in its latched position, and will lock the pin 72 against the notches 44 of the fixed bracket frame 42, and hold the fixed bracket frame securely anchored with respect to the actuator 60, which in turn is anchored to the vehicle frame 12.

Figure 8:
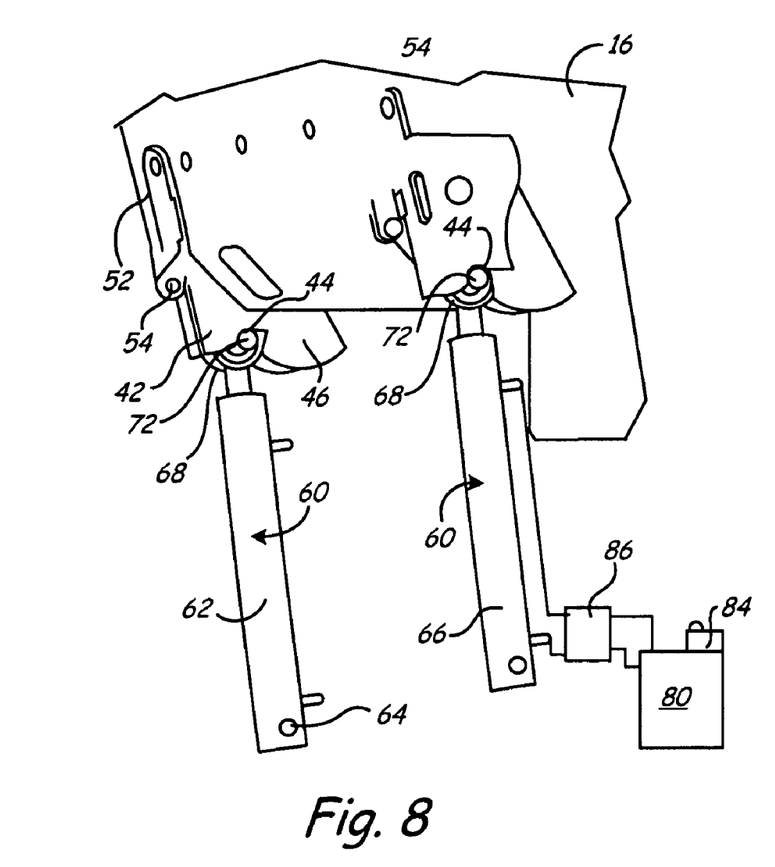
FIG. 8 is a perspective rear view showing the actuators of the present invention in position with the latches for the cab open so that the cab can be tilted forwardly.
Figure 9:
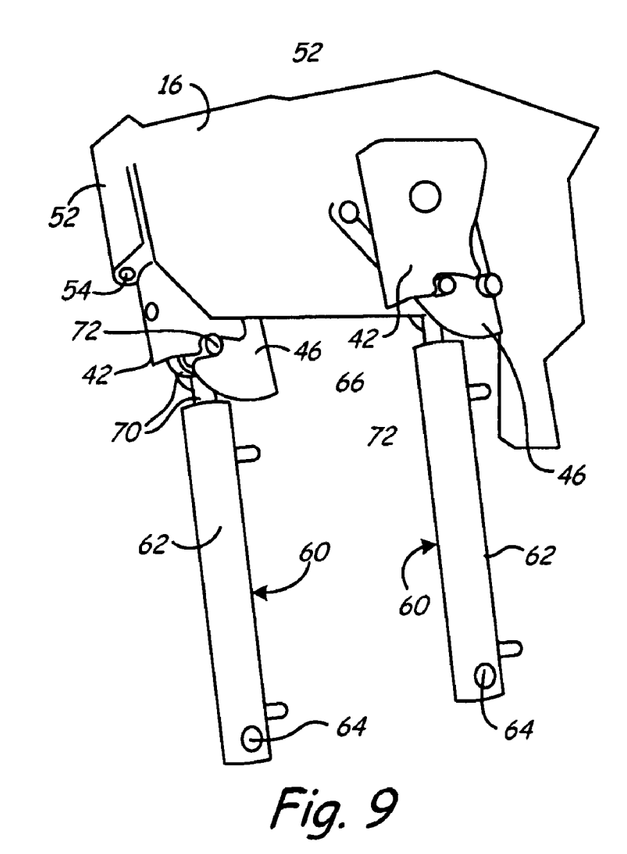
FIG. 9 is a view similar to FIG. 8, with the latches for the cab in a closed position.

The arrangement of the cab latches and the actuators is also shown in FIGS. 8 and 9, and referring to those figures, it can be seen in FIG. 8 that the latches 40 are in a released position, and while each pin 72 is positioned against the notches 44 of the respective bracket frame 42, the latch dog 46 is pivoted away from the pin 72 and the notches 70 no longer retain the respective pin 72. The cab 16 could thus be tilted about its front pivot pins 30 to its fully open position.

In FIG. 9, the latch dogs 46 are shown latched onto the ends of pins 72 so that the cab 16 cannot move relative to the actuators 60 (or other links to the frame), and must move when the actuators are extended or retracted. The rods of the actuators 60 can be extended from their retracted position (shown in FIGS. 4, 8, and 9) to the position shown in FIG. 7, for example, with the rods of the actuators 60 are extended so that the rods 66 have moved the pins 72, and thus the latches 40 and the rear of the cab upwardly. The rear portion of the cab 16 has pivoted about the pivot pin 30 so that the operator's seat 17A is tilted up and forwardly a selected number of degrees to increase the downward visibility out of the front of the cab. This is the cab position shown at 16A in FIG. 1, as well as in FIGS. 6 and 7, and is a selected second working position.

The actuators 60 are secured relative to the frame 12, so that they hold the cab securely for operation. The operator controls for the backhoe are inside the cab, and accessible to the operator. The operator controls are illustrated schematically in FIG. 1 by the box 80, as well as in FIGS. 2 and 8. The rods of the actuators can be secured directly to the cab, without latches 40, if the cab does not have to be pivoted forwardly for servicing components below the cab.

The controls 80 are not only for the backhoe but for other loader controls, and in the form shown, a cab position sensor 82 (FIG. 4) that senses the position of the cab 16 is used to provide a signal to the controls 80 to prevent the lift cylinders 17 for the loader arms from being operated to lift the loader lift arms when the cab 16 is tilted, and also to lock out the ground drive when the cab is tilted. The cab position sensor is shown schematically, and can be mounted right on the frame 12 so that when the cab is in its lowered working position, the sensor is actuated. This sensor 82 can be a switch, a Hall effect sensor, a proximity sensor, or any other desired sensor that will operate to sense when the cab is not in its normal working position.

Controls 80 can also include a switch 84 for operating the actuators 60, and such a switch is shown schematically in FIG. 8. The actuators 60 normally are operated through hydraulic controls 86 if the actuator 60 are hydraulic actuators, or if electric actuators, the signal would be provided to the internal motor of the actuators.

Figure 10:
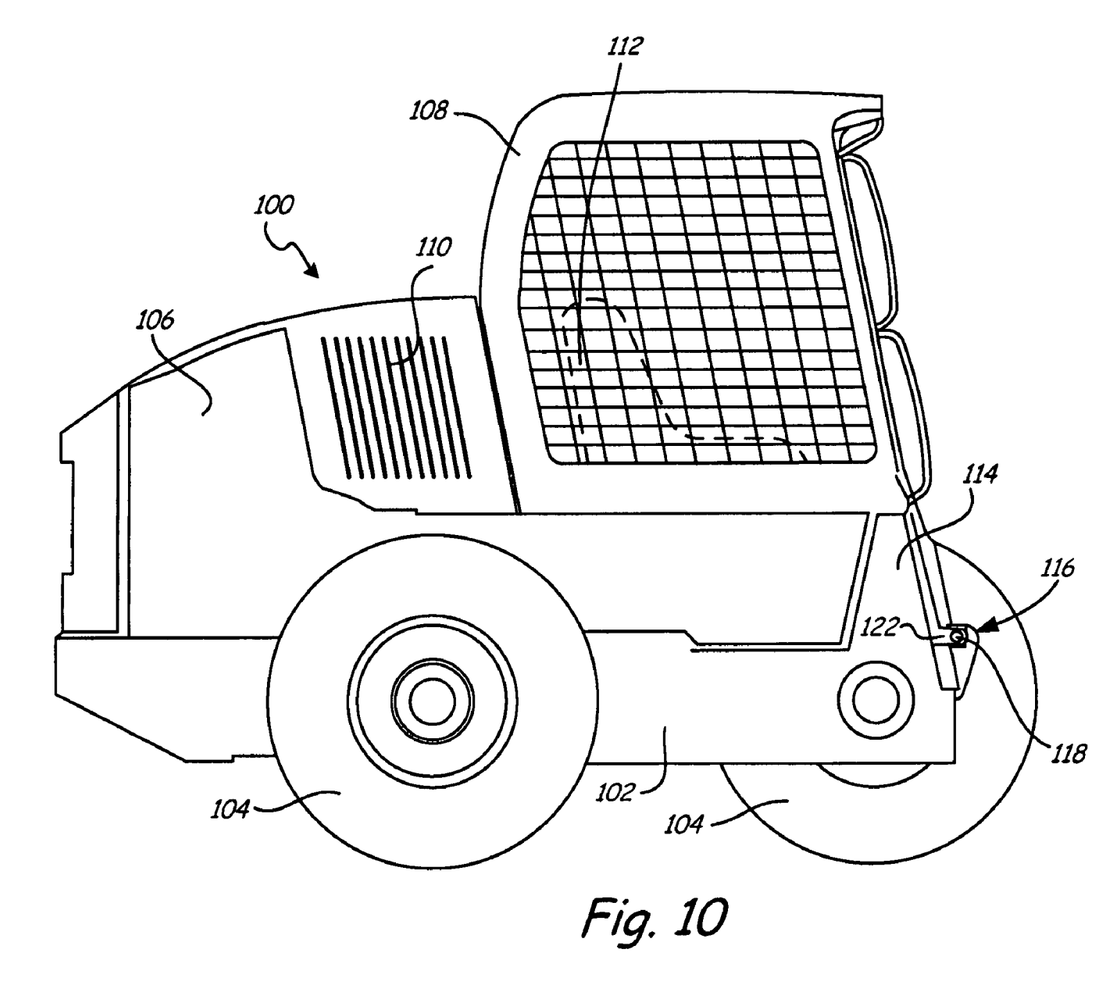
FIG. 10 is a side view of a skid steer vehicle having a forward pivoting cab with the pivot mounting in a second position.

A second mounting arrangement or form is illustrated in FIGS. 10-13. Referring to FIG. 10 for a general showing, a skid steer loader or vehicle 100 has a frame 102, and ground support wheels 104. The front wheel on the near side of the frame 102 has been removed for clarity. The engine compartment 106 houses an engine, and an operator's station or cab 108 is supported on top of the frame ahead of the engine compartment and other components that are in a housing 110.

The operator's station or cab construction can be the same as it is in the first form of the invention. The operator's station includes an operator's seat 112 that is supported on a seat pan as previously shown. In this form of the invention, the cab 108 is pivoted to a pivot support assembly 116 that mounts on a front cross member 114 of the frame 102. The pivot axis 118 of the cab is located forwardly from and lower than the pivot axis of the cab in the first form of the invention, as will be shown.

Figures 11, 12:
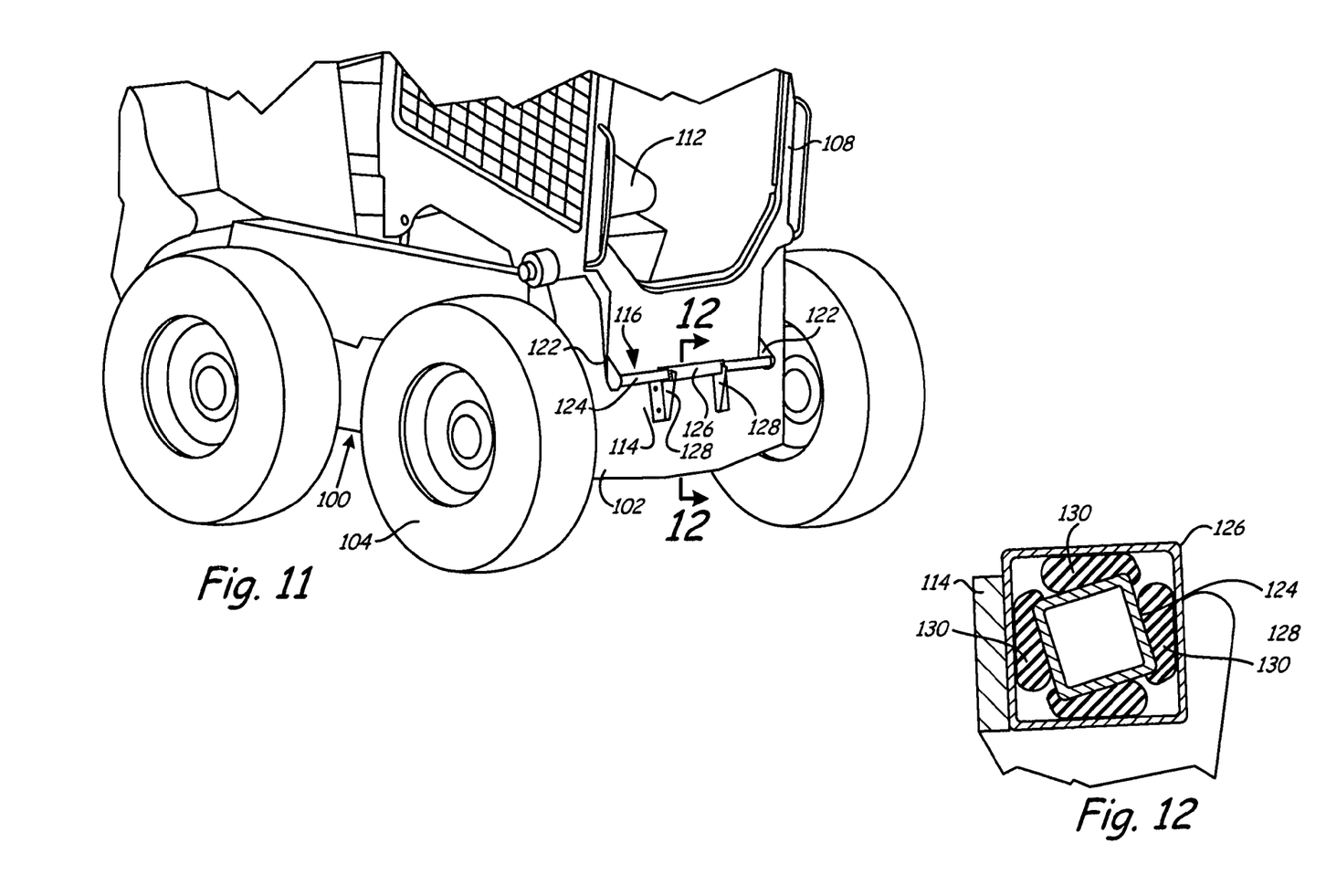
FIG. 11 is a fragmentary front perspective view of the skid steer vehicle of FIG. 10 showing the cab pivot supporting system.
FIG. 12 is a sectional view taken along line 12-12 in FIG. 11.
Figure 13:
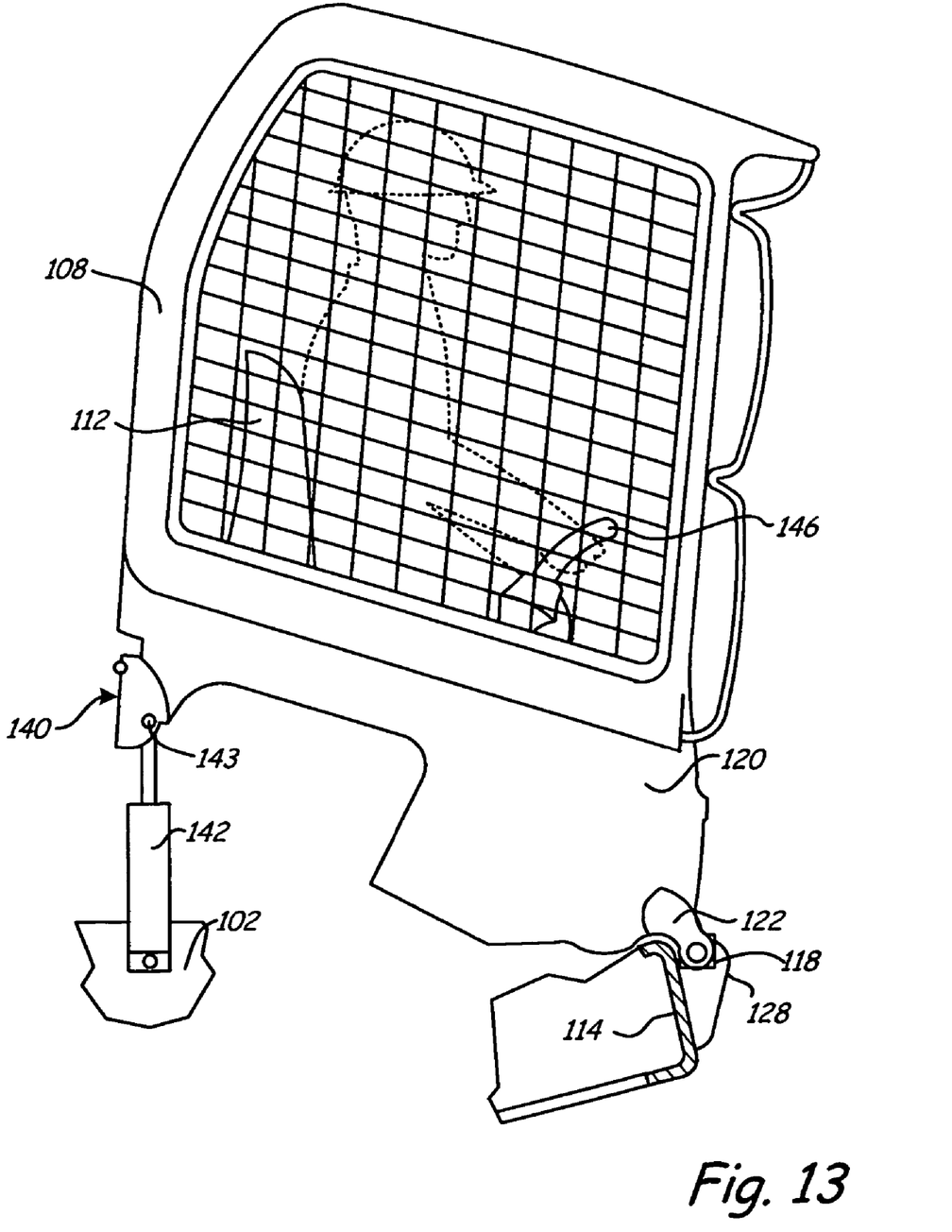
FIG. 13 is a side view of the cab of the second form of the invention in its forwardly tilted position with parts broken away to show the mounting of the pivot for the cab.

In this form of the invention, as shown in FIG. 13, the cab 108 has side walls 120 along the lower portion of the cab, and on each side of the cab, there is a support arm 122 that is fixed to the cab and extends forwardly from the cab. The outer end curves downwardly. The arms 122 form pivot brackets and have end portions that are mounted on the pivot support 116, which as shown in FIG. 11, is a torsion bar assembly. The arms 122 are fixedly mounted onto opposite ends of a square cross section pivot tube 124 that forms part of the pivot bracket. As can be seen, one of the arms 122 is on each end of this pivot tube 124. The tube 124 is mounted within an outer housing tube 126, that in turn is fixed to support brackets 128 in a suitable manner. The support brackets 128 are bolted directly to the front cross member 114 of the vehicle frame.

The pivoting of the cab causes the tube 124 to rotate, and this rotation of the tube 124 is resisted by conventional elastomeric pads or bushings 130 mounted on the inside of the outer housing tube 126 and to the outside of tube 124. FIG. 12 illustrates this torsion loading construction, where the tube 124 is shown on the inside of the tube 126, and the elastomeric pads 130 are positioned on all four sides of the tube 124 between the inner surface of the outer tube 126 and the outer surface of tube 124. The ends of the tube 124, as stated, are fixed to the arms 122.

The showing in FIG. 12 is schematic to show the torsional loading which is to aid in raising the rear of the cab as the cab is moved to an open position. The "rest" position of the elastomeric pads 130 is normally when the cab is in its fully opened position illustrated in the first form of the invention. As the cab rotates down to its closed position, the tube 124 rotates and the corners of the tube 124 compress portions of the elastomeric pads 130. This compression provides a spring loading tending to resist the rotation of the tube 124, and in other words, provide a force that would tend to assist in lifting the rear portions of the operator's cab.

Lower side plates 120 of the operator's cab or station, have latch assemblies 140 at the rear portion that are identical to the latch assemblies in the operator construction shown in the first form of the invention. The actuators 142 carry pins 143 that are latched in place as previously shown, and the base ends of the actuators 142 all mounted onto the frame 102 of the vehicle. This is illustrated only schematically in FIG. 13.

In FIG. 13, the cab 108 is in its raised second working position, and the operator's seat 112 as shown is tilted forwardly, so that the vehicle and backhoe control levers that are illustrated in this form of the invention at 146 are moved forward as well. The operator that is outlined in the cab or operator's station 108 has increased visibility of digging operations close to the front end of the skid steer vehicle.

The same types of cab position sensor can be utilized in this form of the invention for providing an interlock to prevent operation of loader arms (which are not shown in the second form of the invention) as well as the vehicle ground drive when the cab is tilted to its second working position. The amount of pivoting of approximately 15° forwardly is maintained in the second form of the invention as well, but again, the operator is raised when moved forwardly to a different position with 15° pivoting when the pivot axis of the cab is moved forwardly and downwardly as shown in the second form of the invention.

It can thus be seen that by tilting the operator's seat upwardly in the range of 15 degrees from its normal working position, to raise the back of the cab, and thus the operator's seat up and forwardly, an operator of a backhoe can observe and provide close control of the digging bucket at greater depths in the second working position than when the cab is in its first normal loader operating working position. The increased field of view can be achieved without having to relocate the operator to a different seat. This concept of a tilting operator station or cab can be used with any loader that is provided with a backhoe attachment at the front, and on other vehicles where increased visibility in a downward angular direction is helpful.

Although the present invention has been described with reference to preferred embodiments, workers skilled in the art will recognize that changes may be made in form and detail without departing from the spirit and scope of the invention.

What is claimed is:

1. A cab for a work vehicle having a frame with a first support for a digging work arm at one end of the frame, a second support adjacent the one end of the frame for pivotally mounting the cab about a transverse axis, the cab including an operator's compartment with an operator support, a control for controlling the pivoting of the cab about its pivotal mounting, said control being operable to permit tilting the cab about the axis in a direction so that upper portions of the cab move upwardly and toward the one end a selected number of degrees to a selected position and to retain the cab in the selected position, wherein the selected position is a working position during use of the digging work arm.

2. The cab of claim 1, wherein the digging arm is a backhoe.

3. The cab of claim 1, wherein the control includes latches for holding the cab in a normal position relative to the frame, the latches having a first portion that moves with the cab and a second anchor portion that remains with the frame, the second anchor portion being mounted relative to the frame and including an extendable and retractable support.

4. The cab of claim 1, wherein the control comprises an actuator that extends and retracts one end of the actuator being secured to the frame, and the other end being mounted relative to the cab.

5. A loader having a frame, the frame having a forward end and a rearward end, an operator's cab mounted on the frame in a first working position for operating loader arms, and pivotally mounted to the frame about a generally horizontal axis adjacent the forward end of the frame, a mounting structure on the loader for supporting a work arm for digging at the forward end of the frame, said cab being pivotable in a direction to move rear portions of the cab upwardly and an operator's seat in the cab forwardly about the pivotal mounting to a second working position for operating loader arms wherein an operator's seat is raised and moved forwardly, and a mechanical connection between the cab and the frame for retaining the cab in the second working position.

6. The loader of claim 5, wherein the mechanical connection comprises a power actuator between the cab and the frame.

7. The loader of claim 6, wherein said power actuator is connected to the cab through a releasable latch that permits releasing the cab from the power actuator for permitting pivoting of the rear portions of the cab upwardly beyond the second working position.

8. The loader of claim 5, wherein the mechanical connection comprises an extendable and retractable linear power actuator.

9. The loader of claim 5, wherein said loader has a lift arm pivotally mounted to rear portions of the frame with a forward portion of the lift arm that can be raised and lowered, a sensor for sensing the position of the cab, and an interlock to prevent the lift arm from being raised and lowered when the cab is in other than the first working position.

10. The loader of claim 5, wherein the pivotal mounting of the cab to the frame includes a torsion loading assembly providing a spring assist tending to raise the rear portions of the cab.

11. The loader of claim 10, wherein said torsion assembly includes a fixed member, a movable member coupled to the cab that rotates upon pivoting of the cab, and resilient members between the fixed member and the rotating member that are compressed as the rotating member rotates to provide the spring loading.

12. The loader of claim 5, wherein the pivotal mounting of the cab to the frame includes a pivot assembly coupled to a forward end of the frame and extending between sides of the frame.

13. The loader of claim 12, wherein said pivot assembly comprises a torsion bar, arm members on the cab attached to opposite members of the torsion bar, whereby as the cab is pivoted, the torsion bar rotates about an axis.

14. An operator's station for a work vehicle having a frame, a first support for a digging work arm at a forward end, a second support adjacent the forward end of the frame for pivotally mounting an operator's station on the frame, the operator's station having an operator seat, and a device at rear portions of the operator's station operable to hold the operator's station pivoted upwardly from a normal position so that the operator's station is moved upwardly and retained in a working position such that an operator on the operator's seat can observe an outer end of the digging arm at a greater depth below a surface supporting the frame during operation of the digging arm.

15. The operator's station of claim 14 including latches releasably holding the operator's station in the normal position for operation of a loader.

16. The operator's station of claim 15, wherein the latches have a first portion that moves with the operator's station and a second anchor portion that remains with the frame, the second anchor portion being mounted relative to the frame and including an extendable and retractable support.

* * * * *